(12) United States Patent
Kahrizi et al.

(10) Patent No.: US 9,197,381 B2
(45) Date of Patent: Nov. 24, 2015

(54) LOW COST AND ROBUST RECEIVER ARCHITECTURE FOR DOWN LINK CARRIER AGGREGATION

(71) Applicant: Broadcom Corporation, Irvine, CA (US)

(72) Inventors: Masoud Kahrizi, Irvine, CA (US); Bernd Pregardier, Oceanside, CA (US); John Cumming Leete, Huntington Beach, CA (US)

(73) Assignee: Broadcom Corporation, Irvine, CA (US)

( * ) Notice: Subject to any disclaimer, the term of this patent is extended or adjusted under 35 U.S.C. 154(b) by 133 days.

(21) Appl. No.: 13/919,868

(22) Filed: Jun. 17, 2013

(65) Prior Publication Data

US 2014/0355526 A1  Dec. 4, 2014

Related U.S. Application Data

(60) Provisional application No. 61/829,188, filed on May 30, 2013.

(51) Int. Cl.
*H04L 5/00* (2006.01)
*H04J 1/10* (2006.01)
*H04L 27/00* (2006.01)

(52) U.S. Cl.
CPC ... *H04L 5/00* (2013.01); *H04J 1/10* (2013.01); *H04L 27/00* (2013.01)

(58) Field of Classification Search
CPC .... H04B 7/0413; H04B 7/00; H04L 27/2601; G01S 13/87; G01S 13/88; G01S 13/887; G01S 13/89; G01S 7/024; G01S 7/41; G01S 7/411; G01S 7/414; G01S 7/42; H01Q 3/42; H03D 7/163; H04W 72/0453
See application file for complete search history.

(56) References Cited

U.S. PATENT DOCUMENTS

| | | | |
|---|---|---|---|
| 2004/0014435 A1* | 1/2004 | Woo et al. | 455/103 |
| 2007/0259643 A1* | 11/2007 | Wu | 455/315 |
| 2008/0132192 A1* | 6/2008 | Lim | 455/315 |

* cited by examiner

*Primary Examiner* — David Oveissi
(74) *Attorney, Agent, or Firm* — Sterne, Kessler, Goldstein & Fox P.L.L.C.

(57) ABSTRACT

Various configurations and arrangements of systems and methods for providing multi-carrier aggregation are described. A system in accordance with the disclosure can include a first mixer configured to receive a first signal in a first frequency band, a second mixer configured to receive a second signal in a second frequency band, a third mixer configured to receive the second signal in the second frequency band, and a fourth mixer configured to receive a third signal in a third frequency band. The system can further include a controller configured to selectively activate one of the first mixer and the second mixer, and selectively activate one of the third mixer and the fourth mixer.

20 Claims, 5 Drawing Sheets

LOW COST AND ROBUST RECEIVER ARCHITECTURE FOR DOWN LINK CARRIER AGGREGATION

TECHNICAL FIELD

The present disclosure relates to systems and methods for providing multi-carrier aggregation in a wireless receiver.

BACKGROUND

Mobile wireless communication devices such as cellular telephones, smartphones, personal digital assistants (PDAs), etc. can be configured to communicate with other devices over a multitude of different frequencies. As such, mobile wireless communication devices, as well as the devices with which they communication are required to include circuitry capable of receiving and transmitting communication signals at a multitude of different frequencies. In some situations, it is desirable to receive and demodulate two or more communication signals in different frequency bands using a technique referred to as multi-carrier aggregation. In this way, multiple types of signals, e.g., voice, data, etc., can be received and demodulated simultaneously to provide a more pleasing user experience. However, providing multi-carrier aggregation can increase the cost and power consumption of a communication device.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF THE DISCLOSURE

Figure 1:
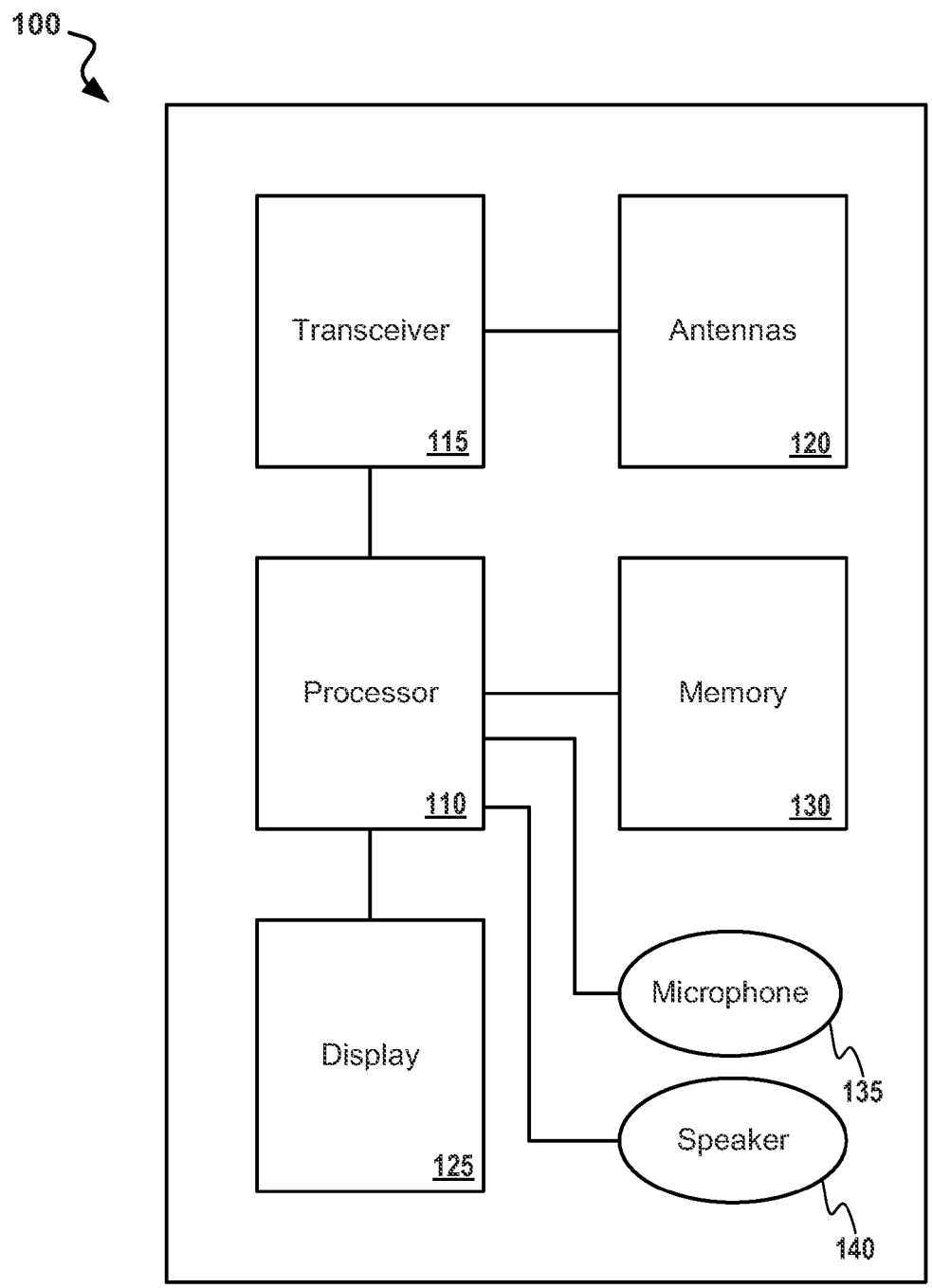
FIG. 1 illustrates a block diagram of an exemplary communication device that utilizes a receiver configured to provide multi-carrier aggregation.

FIG. 1 is a block diagram of an example communication device 100 that can utilize a receiver configured to provide multi-carrier aggregation. Referring to FIG. 1, the communication device 100 may include a processor 110, memory 130, a transceiver 115 and antennas 120. The communication device 100 may also include a display 125, a microphone 135 and a speaker 140.

The communication device 100 and its components may comprise suitable logic, circuitry, interfaces and/or code that may be operable to perform at the least the functions, operations and/or methods described herein. The communication device 100 may be part of a base station (BS) or part of user equipment (UE) in a wireless communication system. In an exemplary 3GPP wireless communication system, the BS may be referred to as a node B (NB) (eNB in LTE). In an example multi-input/multi-output (MIMO) communication system, the BS may be referred to as an access point (AP). The UE may be referred to as a station (STA). An AP and/or STA may be utilized in wireless local area network (WLAN) systems.

The antennas 120 may enable the communication device 100 to transmit and/or receive signals, for example radio frequency (RF) signals, via a wireless communication medium. The communication device 100 may also be depicted as comprising one or more transmitting antennas, and one or more receiving antennas without loss of generality.

The memory 130 may include a computer-readable memory including removable and non-removable storage devices including, but not limited to, Read Only Memory (ROM), Random Access Memory (RAM), compact discs (CDs), digital versatile discs (DVD), etc. The memory 130 can include program modules that perform particular tasks as described herein. Computer-executable instructions, associated data structures, and program modules represent examples of program code for being executed by the processor 110 to perform steps of the methods disclosed herein.

The processor 110 can be configured to control overall operation and/or configuration of the communication device 100. The processor 110 can also be configured to execute one or more applications such as short message service (SMS) for text messaging, electronic mailing, audio and/or video recording, and/or other software applications such as a calendar and/or contact list to provide some examples. The processor 110 may receive information from, among other things, the display 125, microphone 135, and/or speaker 140. The processor 110 may also receive information from other electrical devices, such as the transceiver 115, or host devices that are coupled to the communication device 100. The processor 110 can be configured to provide this information to the transceiver 115, display 125, microphone 135, and/or speaker 140.

The display 125, microphone 135, and speaker 140 can be configured as a user interface for the communication device 100 capable of receiving user input and providing information output to the user. For example, in the case of a mobile telephone, the microphone 135 can be used for receiving voice data from the user and the speaker 140 can be used for presenting voice data to the user. The microphone 135 and speaker 140 can also be configured for receiving and confirming verbal commands. The display 125 can be configured as a touch-screen display, an alphanumeric keypad, a mouse, or another suitable input/output device. User provided information can be input into the communication device 100 such as by typing on the alphanumeric keypad, typing or selecting on the touch-screen display, selecting with the mouse, and/or through other methods of receiving user input. Information can be provided to the user by displaying the information on the touch-screen display or through other methods of conveying and/or displaying information.

The transceiver 115 can be configured to send and receive electrical signals via the antennas 120. In general, the transceiver 115 can be configured to encode information, such as voice or data, onto one or more carrier waves and send the encoded signal via one or more of the antennas 120 to another device which, upon receipt, decodes the information from the carrier wave(s). In a similar manner, the transceiver 115 can be configured to receive an encoded signal(s) via the antennas 120, decode information, such as voice and/or data, from the encoded signal(s), and pass along the decoded information to the processor 110 for processing and/or presentation to the user.

Figure 2:
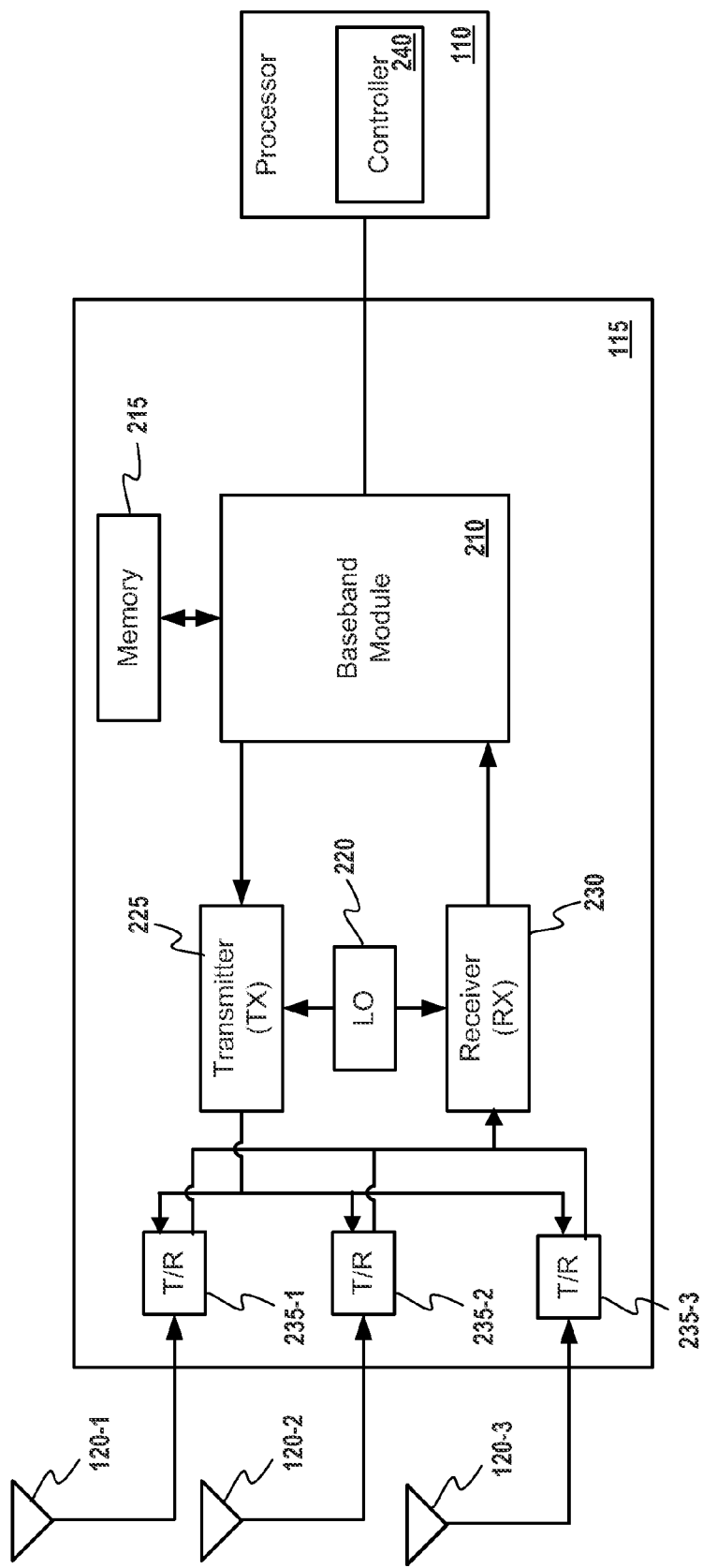
FIG. 2 illustrates a block diagram of an exemplary transceiver that includes a receiver configured to provide multi-carrier aggregation.

FIG. 2 illustrates a block diagram of an example transceiver 115 that can utilize a receiver configured to provide multi-carrier aggregation. The example transceiver 115 may include a baseband module 210 coupled to the processor 110 and a memory 215. The memory 215 can be a part of the memory 130 in FIG. 1 or separate memory. The processor 110 causes the baseband module 210 to modulate data (e.g., data representing voice received from the microphone 135 or data stored in the memory 215) to be transmitted via a transmitter 225 and the antennas 120 (three antennas 120-1, 120-2 and 120-3 are illustrated in this example). The processor 110 can also cause the baseband module 210 to demodulate data representing voice and or any form of media that is received via a receiver 230 and antennas 120. The modulated data is received from and communicated to the antenna 120 via transmit/receive filters 235 (three transmit/receive filters 235-1, 235-2 and 235-3 are illustrated in this example). The baseband module 210 can include two or more baseband receivers to demodulated two or more aggregated baseband signals using devices and methods described herein.

The transmitter 225 may enable the generation of signals, which may be transmitted via selected antennas 120. The transmitter 225 may generate signals by performing coding functions or signal modulation. The receiver 230 may enable the processing of signals received via the selected antennas 120. The receiver 230 may generate data based on the received signals by performing signal amplification, signal demodulation and/or decoding functions.

A local oscillator 220 may be a variable frequency oscillator that is configured to generate carrier signals that are used to up-convert or down-convert signals to be transmitted or received by the antennas 120. The local oscillator 220 is controlled by the processor 110 to produce a frequency that is matched to one of the antennas 120 such that a radio signal is properly shifted up to or down from a selectable carrier frequency.

The processor 110 can also include an RF controller 240. The RF controller 240 can control various switches, mixers, local oscillators and other components in the transmitter 225 and/or the receiver 230 to enable the transmitting and receiving of signals to and from selectable sets of antennas 120 at selectable frequencies. Some of the functions performed by the RF controller 240 are described below.

In the transitional phase from 3G to 4G services, network operators are looking for ways to offer more attractive and distinctive services and thus further enhance the end user experience. On the other side, mobile phone manufacturers and chipset vendors are competing to create highly desirable mobile devices and applications. Increasing downstream data rates is one goal of both network operators and chipset manufactures to fulfill the demand of the new services for the 4G (LTE or long-term evolution) network, for example.

In LTE, from release 10 onward, the transmission bandwidth can be further extended by means of so-called carrier aggregation (CA), where multiple carriers can be aggregated and jointly used for transmission to/from a single device. Downlink inter-band or intra-band carrier aggregation can be used to increase the downlink data rates to the user.

For an RF front-end performing carrier aggregation, this means that the RF front-end routes two signals, received in different frequency bands, simultaneously to two active baseband receivers within the receiver 230 in the transceiver 115. In this case, an RF integrated circuit (RFIC) can utilize two active baseband receivers at any given time. In addition, carrier aggregation can be combined with downlink multi-input/multi-output (MIMO) which in turn uses two additional receivers called a diversity path. Frequency generation blocks can be shared between main and diversity paths for each carrier.

One of the major challenges to support multiple combinations of aggregated carriers is how to combine any two given bands without duplicating RF front-end components such as saw filters and/or switches. For example, Table 1 below shows three scenarios that may be desired by network providers to implement/support on a single communication device.

TABLE 1

| Scenario | LTE Carrier 1 | LTE Carrier 2 |
|----------|---------------|---------------|
| 1 | B7 | B20 |
| 2 | B7 | B3 |
| 3 | B20 | B3 |

In the example shown in Table 1, three bands, B3 (centered around 1800 MHz), B7 (centered around 2.6 GHz), and B20 (centered around 800 MHz) can be aggregated into any of the three scenarios listed.

Conventional implementations of carrier aggregation may require an external switch (e.g., a single-pole-two-throw or SP2T switch). Utilization of such an external SP2T switch, from the addition of an additional differential port from the RFIC, and from degradation in sensitivity due to an insertion loss of the external SP2T switch, can be costly, where additional SP2T switches may be added for each additional band. Moreover, duplicate receiver RF ports may be needed for each additional band, where some RFICs already support more than 20 receiver differential ports in very small packages. Further still, there can be additional complexity associated with the printed circuit board (PCB) design to mitigate unneeded duplication and to add additional SP2T switches into a small area of the PCB.

Figure 3:
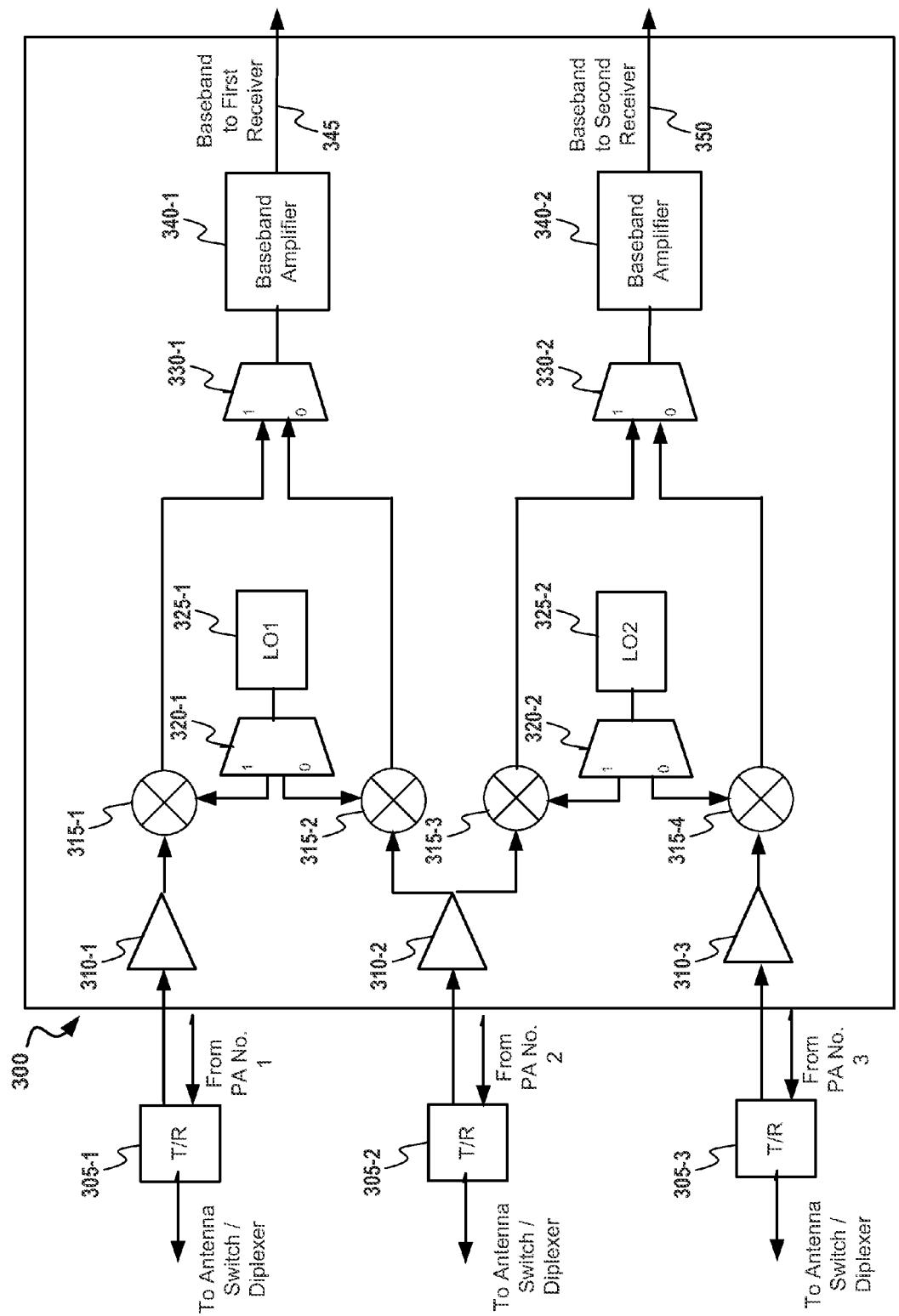
FIG. 3 illustrates a block diagram of an exemplary receiver RF front-end configured to provide multi-carrier aggregation.

FIG. 3 illustrates a block diagram of an exemplary receiver RF front-end 300 configured to provide multi-carrier aggregation in accordance with various embodiments. The RF front-end 300 is communicatively coupled to three transmit/receive filters 305, including a first transmit/receive filter 305-1, a second transmit/receive filter 305-2 and a third transmit/receive filter 305-3. The transmit/receive filters 305 are each coupled to one of a plurality of antennas such as, for example, the antennas 120 shown in FIGS. 1 and 2. The transmit/receive filters 305 also receive modulated signals from power amplifiers of a transmitter, such as the transmitter 225 of FIG. 2, and couple these signals to the antennas.

The transmit/receive filters 305-1, 305-2 and 305.3 transfer signals received from the antennas to low noise amplifiers (LNAs) 310-1, 310-2 and 310-3, respectively. The first LNA 310-1 is coupled to a first mixer 315-1. The second LNA 310-2 is coupled to a second mixer 315-2 and a third mixer 315-3. The third LNA 310-3 is coupled to a fourth mixer 315-4. The mixers 315 can be passive mixers.

The mixers 315 are each selectively activated by a controller such as the RF controller 240 of the processor 110 described above. The RF controller 240 can be configured to selectively activate a pair of the mixers 315 in order to aggregate any combination of the three carrier signals received via the antennas 120.

The first mixer 315-1 and the second mixer 315.2 are coupled to a first de-multiplexer (demux) unit 320-1 which is coupled to a first local oscillator 325-1. The first local oscillator 325-1 can be selectively controlled, by the RF controller 240, for example, to produce a carrier signal in the first frequency band of the first signal received from the first transmit/receive filter 305-1 or a carrier signal in the second frequency band of the second transmit/receive filter 305-2. The third mixer 315-3 and the fourth mixer 315-4 are coupled to a second demux unit 320-2 which is coupled to a second local oscillator 325-2. The second local oscillator 325-2 can be selectively controlled, by the RF controller 240, for example, to produce a carrier signal in the second frequency band of the second signal received from the second transmit/receive filter 305-2 or a carrier signal in the third frequency band of the third transmit/receive filter 305-3.

The first and second demux units 320-1 and 320-2 can route the output signals from the local oscillators 320 to the desired mixer unit 315 that is active. The second carrier signal received from the second transmit/receive filter 305-2 can be routed with the RF controller 240 to the second mixer 315-2 when the third carrier signal is being received via the third transmit/receive filter 305-3 and can be routed to the third mixer 315-3 when the first carrier signal is being selectively received via the first transmit/receive filter 305-1. In this way only one received signal is routed to each of the baseband receivers. Details of further functions that can be performed by the RF controller 240 in controlling the RF frontend 300 are described below.

The first mixer 315-1 and the second mixer 315-2 are coupled to a first multiplexer 330-1 which is coupled to a first baseband amplifier 340-1. The third mixer 315-3 and the fourth mixer 315-4 are coupled to a second multiplexer 330-2 which is coupled to a second baseband amplifier 340-2. The multiplexers 330-1 can be simple electronic couplings and are shown mainly for illustrative purposes. In another example receiver RF front-end, the function of the multiplexers 330 may be inherently achieved within the mixers 315. If a mixer 315 is inactive, its output impedance is high and does not interact with the active mixer that is connected to the same baseband amplifier 310.

The first baseband amplifier 340-1 transfers a filtered first baseband signal 345 to a first receiver to be demodulated and the second baseband amplifier 340-2 transfers a second filtered baseband signal 350 to a second receiver to be demodulated. The first and second receivers can be part of the receiver 230 described above in reference to FIG. 2. The first and second baseband amplifiers 340-1 and 340-2 can be, for example, transimpedence amplifier filters.

In contrast to using a SP2T switch in the integrated circuits of the RF front-end 300, the RF front-end 300, using the example mixers 315, is very robust since it does not suffer from any isolation issues versus an RF front-end that uses a SP2T switch in the RFIC positioned after the second LNA 310-2. In addition, the mux operations of the RF front-end 300 are done at the baseband level which can be implemented without adding additional complexity.

Figure 4:
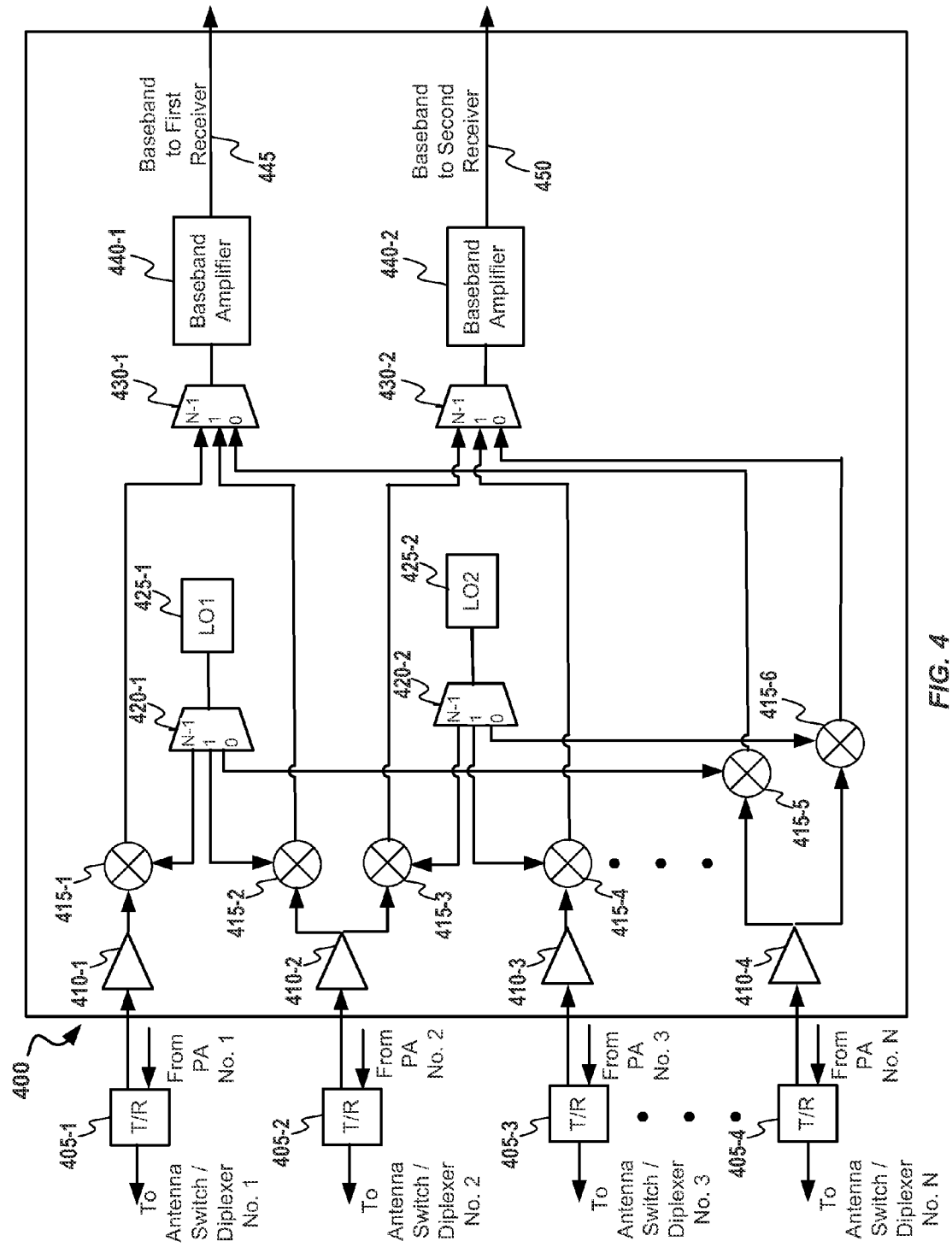
FIG. 4 illustrates a block diagram of another exemplary receiver RF front-end configured to provide multi-carrier aggregation.

FIG. 4 illustrates a block diagram of another example receiver RF front-end 400 configured to provide multi-carrier aggregation. The RF front-end 400 can be communicatively coupled to four or more transmit/receive filters including a first transmit/receive filter 405-1, a second transmit/receive filter 405-2, a third transmit/receive filter 405-3 and an Nth transmit/receive filter 405-4. Each of the transmit/receive filters 405 can be coupled to a separate antenna out of N antennas where each antenna can receive a different frequency. For each additional antenna-transmit/receive filter pair, two additional mixers are added to the configuration illustrated in FIG. 3. For example, the RF front-end 400 is illustrated with a first LNA 410-1 coupled to a first mixer 415-1, a second LNA 410-2 coupled to second and third mixers 415-2 and 415-3, and a fourth LNA 410-4 coupled to fifth and sixth mixers 415-5 and 415-6, respectively. The fifth mixer 415-5 is coupled to a first demux unit 420-1 and a first local oscillator 425-1 along with the first mixer 415-1 and the second mixer 415-2. The sixth mixer is coupled to a second demux unit 420-2 and a second local oscillator 425-2 along with the third mixer 415-3 and the fourth mixer 415-3.

The RF controller 240 can selectively control the first local oscillator 425-1 to produce a carrier frequency in one of the frequency bands received via the first transmit/receive filter 405-1, the second transmit/receive filter 405-2 or the fourth transmit/receive filter 405-4 and selectively activate one of the first mixer 415-1, the second mixer 415-2 or the fifth mixer 405-5 such that the selected signal will be received by a first mux unit 430-1, and processed by a first baseband amplifier 440-1 such that a first baseband signal 445 can be transferred to a first receiver for further demodulation. In a similar fashion, the RF controller 240 can selectively control the second local oscillator 425-2 to produce a carrier frequency in one of the frequencies bands received via the second transmit/receive filter 405-2, the third transmit/receive filter 405-3 or the fourth transmit/receive filter 405-4 and selectively activate one of the third mixer 415-3, the fourth mixer 415-4 or the sixth mixer 405-6 such that the selected signal will be received by a second mux unit 430-2, processed by a second baseband amplifier 440-2 such that a second baseband signal 450 can be transferred to a second receiver for further demodulation. Details of further functions that can be performed by the RF controller 240 in controlling the RF frontend 400 are described below. The first and second baseband amplifiers 440-1 and 440-2 can be, for example, transimpedence amplifier filters.

The RF front-end 400 only illustrates a fourth exemplary antenna and transmit/receive filter 405-4 pair, but those skilled in the art can readily implement other RF front-ends having more than four possible signals received via more than four antennas with each signal potentially being in a different frequency band. For each additional antenna and signal in a different frequency band, two additional mixers 415 are added with one mixer 415 being coupled the first local oscillator 425-1 and routed to the first mux unit 430-1, and the other mixer 415 being coupled with the second local oscillator 425-2 and routed to the second mux unit 430-1 as determined by the RF controller 240. In this way, any combination of two out of N carrier signals can be aggregated and demodulated with the first and second baseband receivers.

Figure 5:
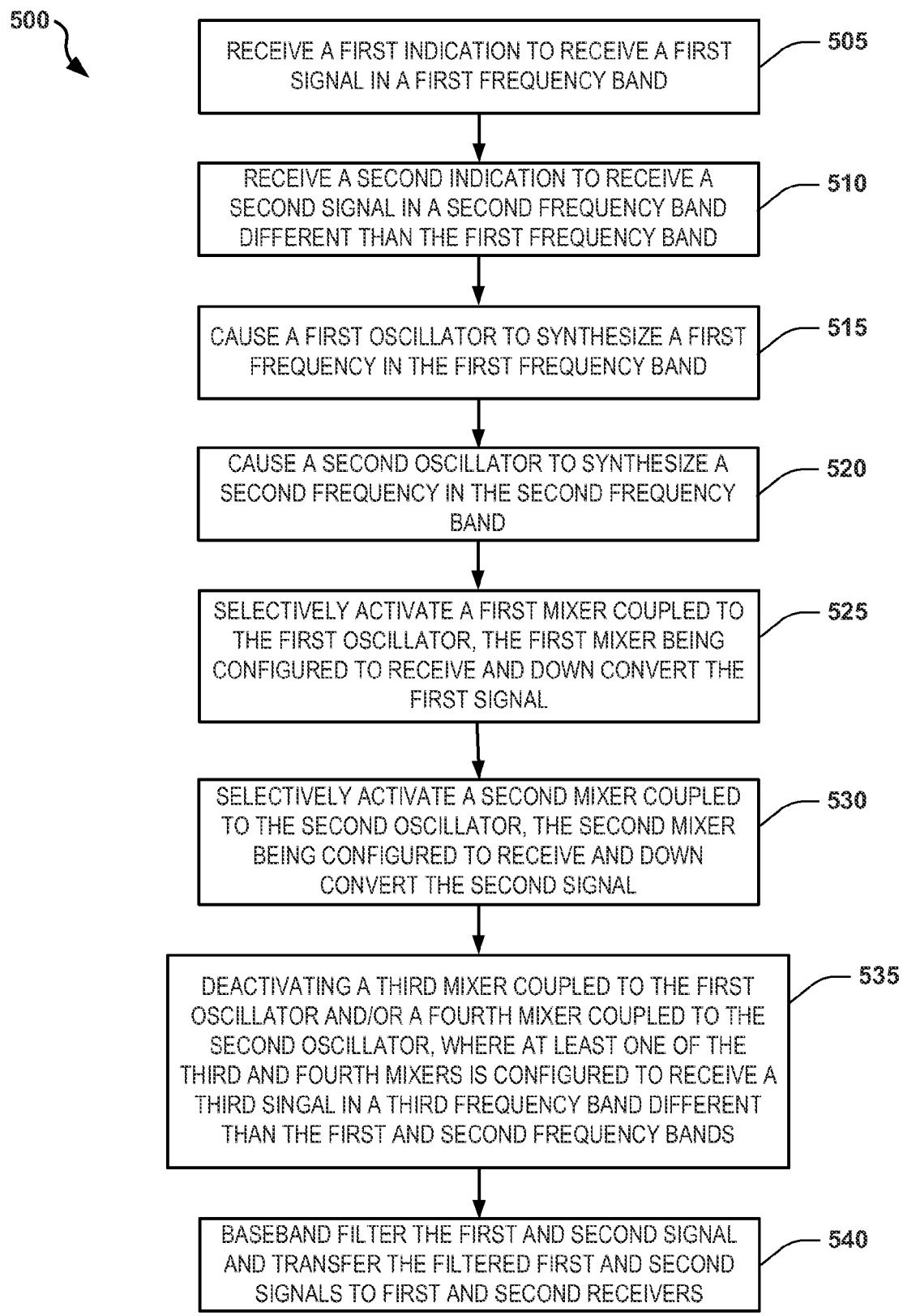
FIG. 5 illustrates a flow chart of an exemplary process for providing multi-carrier aggregation.

FIG. 5 illustrates a flow chart of an exemplary process 500 for providing multi-carrier aggregation. The process 500 is an example, and stages can be rearranged, added or omitted, depending on the embodiment. The process 500 can be used, for example, for controlling either of the RF front-ends 300 or 400 of FIGS. 3 and 4 with the RF controller 240 of FIG. 2. The process 500 will be described with further reference to FIGS. 2 and 3.

At 505, the RF controller 240 receives a first indication to receive a first wireless signal in a first frequency band. At 510, the RF controller 240 receives a second indication to receive a second wireless signal in a second frequency band that is different than the first frequency band. The indications received at 505 and 510 can be received from various sources. For example, the processor 110 can receive an indication from a user via a user interface mechanism such as the display 125 or the microphone 135 and forward the indication to the RF controller 240. Alternatively, the RF controller can be configured to autonomously select which signals to receive.

The indications received at 505 and 510 can indicate to the RF controller 240 which two of three or more frequency bands are to be aggregated simultaneously using the RF front-end 300. At 515, the RF controller, based on one or both of the first received indication and the second indication, causes the first local oscillator 325-1 to synthesize a first signal at a first frequency in the first frequency band. At 520, the RF controller, based on one or both of the first received indication and the second indication, causes the second local oscillator 325-2 to synthesize a second signal at a second frequency in the second frequency band.

The RF controller can determine which of the first local oscillator 325-1 or the second local oscillator 325-2 to use to synthesize which frequency based on which pair of frequencies need to be aggregated and received simultaneously. For example, if the first frequency band is located in a frequency band received by an antenna coupled to the first transmit/receive filter 305-1 and the second frequency band is located in a frequency band that can be received by an antenna coupled to the second or third transmit/receive filter 305-2 or 305-3, respectively, the RF controller can cause the first local oscillator 325-1 to synthesize the first frequency and cause the second local oscillator to synthesize the second frequency, since only the first local oscillator 325-1 is coupled to the first transmit/receive filter 305-1 (via the first LNA 310-1 and the first mixer 315-1) and the second local oscillator is coupled to both the second and third transmit/receive filters 305-2 and 305-3. The RF controller 240 can make similar logical decisions depending on which antennas and transmit/receive filters 305 are coupled to which local oscillators 325.

At 525, the RF controller 240 selectively activates one of the four mixers 315 (in the example RF front-end 300 that includes four mixers 315) that is coupled to the first local oscillator 325-1. Which one of the four mixers 315 to activate is chosen based on which mixer 315 can couple the first signal indicated at stage 505 to the first local oscillator 325-1. Upon activation of the one mixer 315, the first received signal in the first frequency band can be down-converted from the first frequency band to baseband.

At 530, the RF controller 240 selectively activates another one of the four mixers 315 (in the example RF front-end 300 that includes four mixers 315) that is coupled to the second local oscillator 325-2. The other mixer 315 to be activated is chosen based on which mixer 315 can couple the second signal indicated at stage 510 to the second local oscillator 325-2. Upon activation of the another mixer 315, the second received signal in the second frequency band can be down-converted from the second frequency band to baseband.

At 535, the RF controller 240 deactivates, or refrains from activating, one or more of the other two mixers, one mixer coupled to the first local oscillator 325-1 and one mixer coupled to the second local oscillator 325-2, such than little or no interference is caused by another signal or noise received via another one of the antennas in another frequency band other than the frequency bands selected at stages 505 and 510.

The RF controller 240 can be configured to work with other RF front-ends, such as the RF front-end 400, that can receive more than three signals in three different frequency bands. The RF controller can choose which pair of mixers 315 to activate based on which received frequency bands can be coupled to, and down-converted with which one of the two local oscillators 325. This can be done because, in some embodiments such as those depicted in FIGS. 3 and 4, all but one of the frequency bands can be coupled to the first local oscillator 325-1 and the one frequency band that cannot be coupled to the first local oscillator 325-1 can be coupled to the second local oscillator 325-2. In this way, any pair of three or more frequency bands can be aggregated to be received simultaneously.

At 540, the first and second signals indicated to be received at stages 505 and 510, can be baseband filtered by the first and second baseband amplifiers 340-1 and 340-2 and forwarded to the first and second receivers to be further demodulated.

It should be noted that the present disclosure includes various diagrams that may depict an example architectural or other configuration for the various embodiments, which is done to aid in understanding the features and functionality that can be included in embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the terms "example" or "exemplary" are used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the disclosure are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. An apparatus, comprising:
a first mixer configured to receive a first signal in a first frequency band;
a second mixer configured to receive a second signal in a second frequency band;
a third mixer configured to receive the second signal in the second frequency band;
a fourth mixer configured to receive a third signal in a third frequency band;
a first demultiplexer coupled to the first mixer and the second mixer;
a second demultiplexer coupled to the third mixer and the fourth mixer; and
a controller configured to:
cause the first demultiplexer to route a first frequency in the first frequency band to the first mixer to selectively activate the first mixer or a second frequency in the second frequency band to the second mixer to selectively activate the second mixer, or
cause the second demultiplexer to route the second frequency in the second frequency band to the third mixer to selectively activate the third mixer or a third frequency in the third frequency band to the fourth mixer to selectively activate the fourth mixer.

2. The apparatus of claim 1, further comprising:
a first local oscillator coupled to the first mixer and the second mixer; and
a second local oscillator coupled to the third mixer and the fourth mixer,
wherein the first local oscillator is configured to selectively synthesize the first frequency in the first frequency band and the second frequency in the second frequency band, and
wherein the second local oscillator is configured to selectively synthesize the second frequency in the second frequency band and the third frequency in the third frequency band.

3. The apparatus of claim 2, wherein the controller is further configured to:
cause the first local oscillator to selectively synthesize the first frequency or the second frequency, and
cause the second local oscillator to selectively synthesize the second frequency or the third frequency.

4. The apparatus of claim 3, further comprising:
a fifth mixer configured to receive a fourth signal in a fourth frequency band; and
a sixth mixer configured to receive the fourth signal in the fourth frequency band,
wherein first local oscillator is further coupled to the fifth mixer,
wherein the second local oscillator is further coupled to the sixth mixer,
wherein the first local oscillator and the second local oscillator are further configured to synthesize a fourth frequency in the fourth frequency band,
wherein the first demultiplexer is further coupled to the fifth mixer,
wherein the second demultiplexer is further coupled to the sixth mixer, and
wherein the controller is further configured to:
cause the first local oscillator to selectively synthesize the first frequency, the second frequency, or the fourth frequency,
cause the second local oscillator to selectively synthesize the second frequency, the third frequency or the fourth frequency,
cause the first demultiplexer to route the first frequency in the first frequency band to the first mixer to selectively activate the first mixer or the second frequency in the second frequency band to the second mixer to selectively activate the second mixer or the fourth frequency in the fourth frequency band to the fifth mixer to selectively activate the fifth mixer, or
cause the second demultiplexer to route the second frequency in the second frequency band to the third mixer to selectively activate the third mixer or the third frequency in the third frequency band to the fourth mixer to selectively activate the fourth mixer or the fourth frequency in the fourth frequency band to the sixth mixer to selectively activate the sixth mixer.

5. The apparatus of claim 1, further comprising:
a first receiver coupled to the first mixer and the second mixer; and
a second receiver coupled to the third mixer and the fourth mixer.

6. The apparatus of claim 5, further comprising:
a first baseband amplifier, coupled to the first mixer, the second mixer, and the first receiver, configured to:

receive a first baseband signal from the selectively activated one of: the first mixer and the second mixer,
filter the first baseband signal, and
forward the filtered first baseband signal to the first receiver; and
a second baseband amplifier, coupled to the third mixer, the fourth mixer, and the second receiver, configured to:
receive a second baseband signal from the selectively activated one of the third mixer and the fourth mixer,
filter the second baseband signal, and
forward the filtered second baseband signal to the second receiver.

7. A communication device, comprising:
a plurality of antennas including a first antenna, a second antenna, and a third antenna;
a first mixer configured to receive a first signal from the first antenna;
a second mixer configured to receive a second signal from the second antenna;
a third mixer configured to receive the second signal from the second antenna;
a fourth mixer configured to receive a third signal from the third antenna;
a first demultiplexer coupled to the first mixer and the second mixer;
a second demultiplexer coupled to the third mixer and the fourth mixer;
a controller configured to:
cause the first demultiplexer to route a first frequency in a first frequency band to the first mixer to selectively activate the first mixer or a second frequency in a second frequency band to the second mixer to selectively activate the second mixer, or
cause the second demultiplexer to route the second frequency in the second frequency band to the third mixer to selectively activate the third mixer or a third frequency in a third frequency band to the fourth mixer to selectively activate the fourth mixer.

8. The communication device of claim 7, wherein the first signal is in the first frequency band,
wherein the second signal is in the second frequency band, and
wherein the third signal is in the third frequency band.

9. The communication device of claim 8, wherein the first frequency band, the second frequency band, and the third frequency band comprise different bands of frequencies.

10. The communication device of claim 8, further comprising:
a first local oscillator coupled to the first mixer and the second mixer; and
a second local oscillator coupled to the third mixer and the fourth mixer,
wherein the first local oscillator is configured to selectively synthesize the first frequency in the first frequency band and the second frequency in the second frequency band, and
wherein the second local oscillator is configured to selectively synthesize the second frequency in the second frequency band and the third frequency in the third frequency band.

11. The communication device of claim 10, wherein the controller is further configured to:
cause the first local oscillator to selectively synthesize the first frequency or the second frequency, and
cause the second local oscillator to selectively synthesize the second frequency or the third frequency.

12. The communication device of claim 7, further comprising:
a first receiver coupled to the first mixer and the second mixer; and
a second receiver coupled to the third mixer and the fourth mixer.

13. A method, comprising:
receiving a first signal via a first antenna, the first antenna being coupled to a first mixer, the first mixer being coupled to a first demultiplexer;
receiving a second signal via a second antenna, the second antenna being coupled to a second mixer and a third mixer, the second mixer being coupled to the first demultiplexer, the first demultiplexer being coupled to a first local oscillator, and the third mixer being coupled to a second demultiplexer, the second demultiplexer being coupled to a second local oscillator;
causing the first local oscillator to synthesize a first frequency in a first frequency band;
causing the second local oscillator to synthesize a second frequency in a second frequency band;
causing the first demultiplexer to route the first frequency to the first mixer to selectively activate the first mixer to down-convert the first signal with the first frequency; and
causing the second demultiplexer to route the second frequency to the third mixer to selectively activate the third mixer to down-convert the second signal with the second frequency.

14. The method of claim 13, further comprising:
receiving an indication to receive a third signal from a third antenna, the third antenna being coupled to a fourth mixer, the fourth mixer being coupled to the second demultiplexer; and
subsequent to receiving the indication, causing the second local oscillator to synthesize a third frequency in a third frequency band and causing the second demultiplexer to route the third frequency to the fourth mixer to selectively activate the fourth mixer to down-convert the third signal with the third frequency.

15. The method of claim 14, further comprising:
deactivating the third mixer subsequent to receiving the indication to receive the third signal.

16. The method of claim 14, wherein the first frequency band, the second frequency band, and the third frequency band comprise different bands of frequencies.

17. The method of claim 13, further comprising:
receiving a first indication to receive the first signal in the first frequency band; and
receiving a second indication to receive the second signal in the second frequency band,
wherein the first mixer is activated subsequent to receiving the first indication, and
wherein the third mixer is activated subsequent to receiving the second indication.

18. The method of claim 17, wherein receiving the first indication comprises:
receiving the first indication via a user interface of a communication device, and
wherein receiving the second indication comprises:
receiving the second indication via the user interface.

19. The method of claim 13, further comprising:
baseband filtering the down-converted first signal with a first baseband amplifier;
baseband filtering the down-converted second signal with a second baseband amplifier;

transferring the baseband filtered first signal to a first baseband receiver; and transferring the baseband filtered second signal to a second baseband receiver.

20. The method of claim 13, wherein the first antenna and the second antenna are the same antenna.

* * * * *